(12) United States Patent
Yoo et al.

(10) Patent No.: US 7,434,240 B2
(45) Date of Patent: Oct. 7, 2008

(54) SPINDLE MOTOR INCLUDING A BALL COVER HAVING DECELERATING PORTION

(75) Inventors: Jin Seung Yoo, Gwangju-si (KR); Jae Hyun Park, Jinhae-si (KR)

(73) Assignee: LG Innotek Co., Ltd., Seoul (KR)

( * ) Notice: Subject to any disclaimer, the term of this patent is extended or adjusted under 35 U.S.C. 154(b) by 411 days.

(21) Appl. No.: 10/843,423

(22) Filed: May 12, 2004

(65) Prior Publication Data

US 2004/0268376 A1 Dec. 30, 2004

(30) Foreign Application Priority Data

May 13, 2003 (KR) .................. 10-2003-0030096

(51) Int. Cl.
 G11B 33/02 (2006.01)
 G11B 19/20 (2006.01)
 H02K 7/04 (2006.01)
(52) U.S. Cl. .................. 720/702; 310/51; 310/81
(58) Field of Classification Search ......... 720/700–702, 720/705, 695; 360/98.07, 99.04, 99.08, 99.09, 360/99.11; 310/51, 81
See application file for complete search history.

(56) References Cited

U.S. PATENT DOCUMENTS

| | | | | | |
|---|---|---|---|---|---|
| 6,154,436 | A | * | 11/2000 | Yeon | 720/700 |
| 6,205,110 | B1 | * | 3/2001 | Miyamoto et al. | 369/266 |
| 6,249,505 | B1 | * | 6/2001 | Miyamoto et al. | 369/266 |
| 6,333,912 | B1 | * | 12/2001 | Sohn | 720/702 |
| 6,373,154 | B1 | * | 4/2002 | Sohn et al. | 310/51 |
| 6,388,981 | B1 | * | 5/2002 | Sohn et al. | 369/264 |
| 6,452,896 | B1 | * | 9/2002 | Song | 720/702 |
| 6,477,001 | B1 | * | 11/2002 | Yang et al. | 360/99.08 |
| 6,477,133 | B1 | * | 11/2002 | Yoshimura et al. | 720/702 |
| 6,492,750 | B2 | * | 12/2002 | Kikuchi et al. | 310/51 |
| 6,552,992 | B2 | * | 4/2003 | Takeuchi et al. | 369/264 |
| 7,051,346 | B2 | * | 5/2006 | Masaki et al. | 720/706 |
| 2002/0056338 | A1 | * | 5/2002 | Olausson et al. | 74/573 R |

FOREIGN PATENT DOCUMENTS

| | | | | |
|---|---|---|---|---|
| JP | 11113213 | A | * | 4/1999 |
| JP | 11-154371 | | | 6/1999 |
| JP | 11203776 | A | * | 7/1999 |
| JP | 11265546 | A | * | 9/1999 |
| JP | 2001216715 | A | * | 8/2001 |
| JP | 2002333053 | A | * | 11/2002 |
| KR | 100255646 | B1 | | 2/2000 |
| KR | 1020010016752 | A | | 3/2001 |

* cited by examiner

Primary Examiner—Brian E. Miller
Assistant Examiner—Matthew G Kayrish
(74) Attorney, Agent, or Firm—Birch, Stewart, Kolach & Birch, LLP (57) ABSTRACT

Provided is a spindle motor comprising a stator and a shaft provided in the stator. A rotor is coupled with the shaft, and a turntable is connected with the shaft. The turntable has a ball container for receiving a plurality of ball, and the ball container has an inclined inner or outer wall. A ball cover is coupled with the ball container and having decelerating means. Herein, the decelerating means comprise an inclination or protrusions formed in the ball cover.

18 Claims, 7 Drawing Sheets

SPINDLE MOTOR INCLUDING A BALL COVER HAVING DECELERATING PORTION

This Nonprovisional application claims priority under 35 U.S.C. § 119(a) on Patent Application No(s). 10-2003-0030096 filed in KOREA on May 13, 2003, the entire contents of which are hereby incorporated by reference.

BACKGROUND OF THE INVENTION

1. Field of the Invention

The present invention relates to a spindle motor, and more particularly, to a spindle motor in use for optical disk drive which can reduce the vibration induced from eccentricity.

2. Description of the Related Art

In general, a spindle motor in use for an optical disk drive serves to turn an optical disk so that an optical pickup can read data from the optical disk while moving linearly.

When the spindle motor turns the optical disk at high speed, any unbalance of the optical disk may generate vibration, and thus the Ball Auto Balance System (Ball ABS) is adopted to reduce such vibration.

According to the principle of the ball ABS, a predetermined number of balls are received in an integral turntable for turning an optical disk mounted thereon, by which when the optical disk is rotated, the balls are driven in a direction counter to the eccentricity of the optical disk in order to reduce any vibration induced from the eccentricity of the optical disk.

Figure 1:
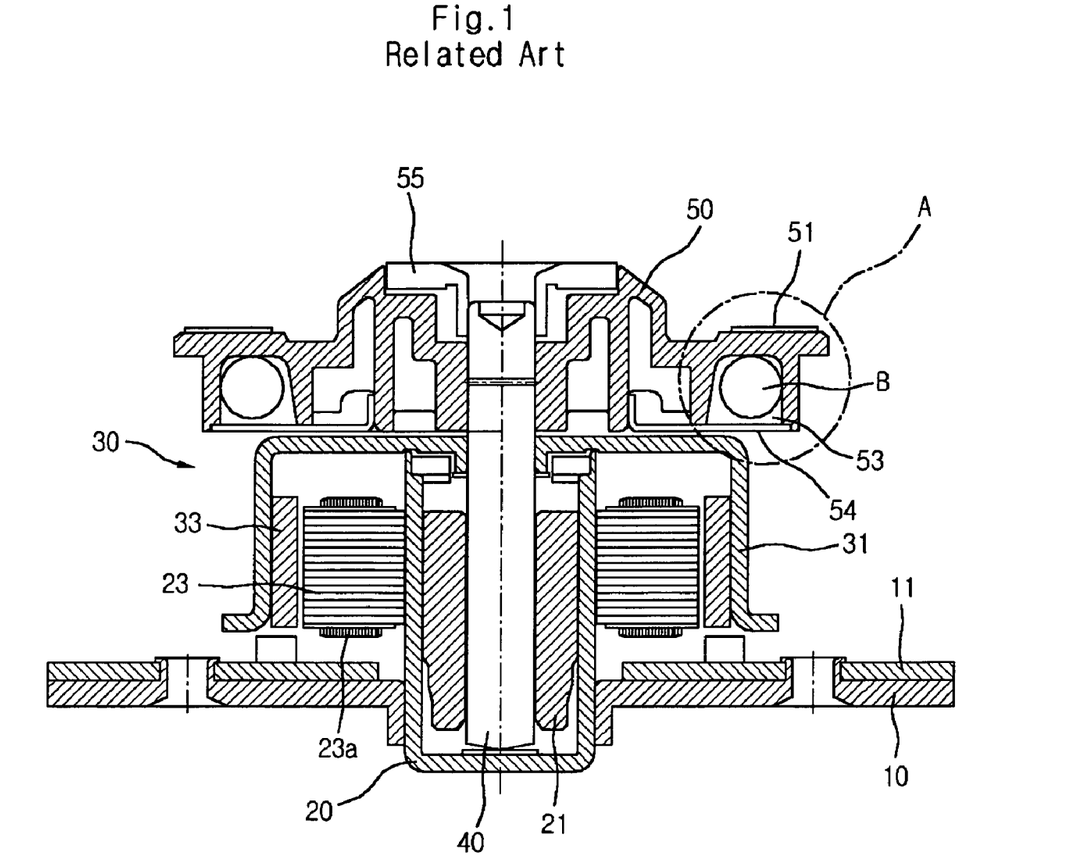
FIG. 1 is a sectional view illustrating conventional spindle motor structure.
Figure 2:
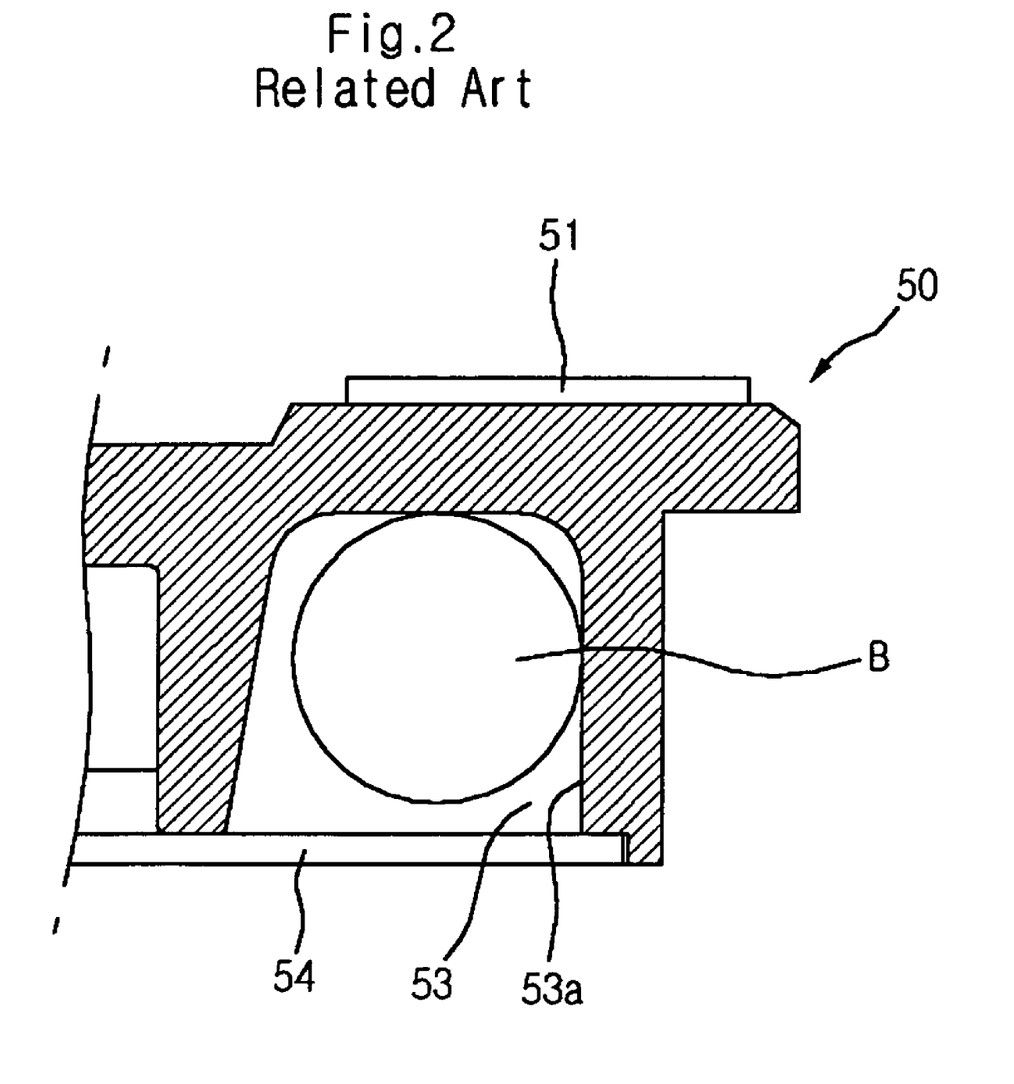
FIG. 2 is an enlargement of a part A in FIG. 2.

FIG. 1 is a sectional view illustrating conventional spindle motor structure, and FIG. 2 is an enlargement of a part A in FIG. 2.

Referring to FIGS. 1 and 2, in the conventional spindle motor in use for an optical disk drive, a stator includes a base plate 10 for fixing the spindle motor, a bearing housing 20 arranged in the center of the base plate 10 and having a metal bearing 21 installed therein and a core assembly 23 mounted on the outside wall of the bearing housing 20.

The core assembly 23 includes a plurality of cores and winding coils 23*a*.

On the top of the base plate 10, there is installed a Printed Circuit Board (PCB) 11 for applying control voltage to the winding coils 23*a*.

By the flow of a predetermined value of current via the PCB 11, the winding coils 23*a* generate magnetic flux.

A shaft 40 is rotatably coupled with the metal bearing 21 mounted within the bearing housing 20, and a rotor yoke 31 is fixed to the shaft 40 extended beyond the bearing housing 20 to rotate along with the shaft 40.

The rotor yoke 31 is cylindrical shaped to surround the tops and sides of the bearing housing 20 and the core assembly 23, and has a magnet 33 attached on the inside surface opposed to the core assembly 23 to constitute a rotor 30.

The magnet 33 has a plurality of N and S poles repeatedly alternating with each other to generate magnetic flux, which in turn interacts with the magnetic flux from the core assembly 23 thereby to rotate the rotor 30.

A turntable 50 is fixed around the shaft 40 extended above the rotor yoke 31 to rotate along with the rotor 30.

The turntable 50 has a buffer member 51 attached on the top thereof to buffer the impact at the mounting of the optical disk and prevent the slippage of the optical disk during the rotation. The turntable 50 also has a ball container 53 on the bottom periphery thereof to receive a suitable number of balls B and a ball cover 54 coupled with the bottom of the ball container 53 to prevent the balls B from escaping from the ball container 53.

The ball container 53 is shaped as a circular track so that the suitable number of balls B inserted into the ball container 53 move and rotate along the circular track in response to the rotation of the turntable 50.

The turntable 50 further has a clamp 55 that is fastened with the top of the shaft 40 to prevent the turntable 50 from escaping from the shaft 40.

The operation of the conventional disk drive motor of the above construction will be described as follows.

First, a voltage applied to the spindle motor is fed to the winding coils 23*a* of the core assembly 23 via the PCB 11.

By the flow of current, the winding coils 23*a* generate magnetic flux, which in turn creates magnetic force through interaction with the magnetic flux from the magnet 33 placed in the inside surface of the rotor yoke 31 opposed to the core assembly 23 thereby to rotate the rotor 30.

That is, the rotor 30 is rotated under the electromagnetic force originated from the interaction or link between the magnetic fluxes from the winding coils 23*a* and the magnet 33.

The rotation of the rotor 30 also cause the shaft 40 coupled with the rotor 30 to rotate, and thus the turntable 50 fixed to the shaft 40 rotates.

This in turn rotates the optical disk recorded with various data, seated on the buffer member 51 of the turntable 50.

In this case, since any unbalance of the optical disk may create vibration, a Ball Auto Balance System (Ball ABS) is adopted to prevent the vibration.

That is, if vibration occurs from the eccentricity of the optical disk, the balls B inserted into the ball container 53 in the bottom periphery of the turn table 50 move in a direction counter to the eccentricity of the optical disk to calibrate the eccentricity thereby reducing vibration.

The ball container 53 receives about 10 balls B. During the rotation of the turntable 50, the balls B move along an outer wall 53*a* of the ball container 53 in a direction counter to the eccentricity of the optical disk to automatically balance the optical disk.

However, the conventional optical disk drive as described above has a following problem. At the time of opening a tray for the purpose of removing or replacing an optical disk, even after the turntable has stopped its rotation, the balls B contained in the ball container 53 continuously roll under the inertia creating noises.

SUMMARY OF THE INVENTION

Accordingly, the present invention is directed to a spindle motor that substantially obviates one or more problems due to limitations and disadvantages of the related art.

An object of the invention is to provide a spindle motor having balls received in a ball container of a turntable, by which when a tray is opened for the purpose of removing or replacing a disk, the balls can be stopped rapidly from the rotation under the inertia in order to reduce rolling noises.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a spindle motor comprising: a stator; a shaft provided on the stator; a rotor coupled with the shaft; a turntable connected with the shaft, and having a ball container for receiving a plurality of ball, the ball container having an inclined outer wall; and a ball cover coupled with the ball container, and having decelerating means.

Preferably, the decelerating means comprise an inclination or protrusions formed in the ball cover.

According to another aspect of the present invention, there is provided a spindle motor comprising: a stator having a base plate, a bearing housing provided on the base plate, a core assembly provided on the bearing housing; a shaft coupled with a metal bearing mounted on the bearing housing; a rotor coupled with the shaft, and having a cylindrical rotor yoke and a magnet provided on the rotor yoke in a position opposed to the core assembly; a turntable connected with the shaft, and having a ball container for receiving a plurality of balls, the ball container having an inclined outer wall; and a ball cover coupled with the ball container, and having decelerating means.

Preferably, the decelerating means comprise an inclination or protrusions formed in the ball cover.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention, wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
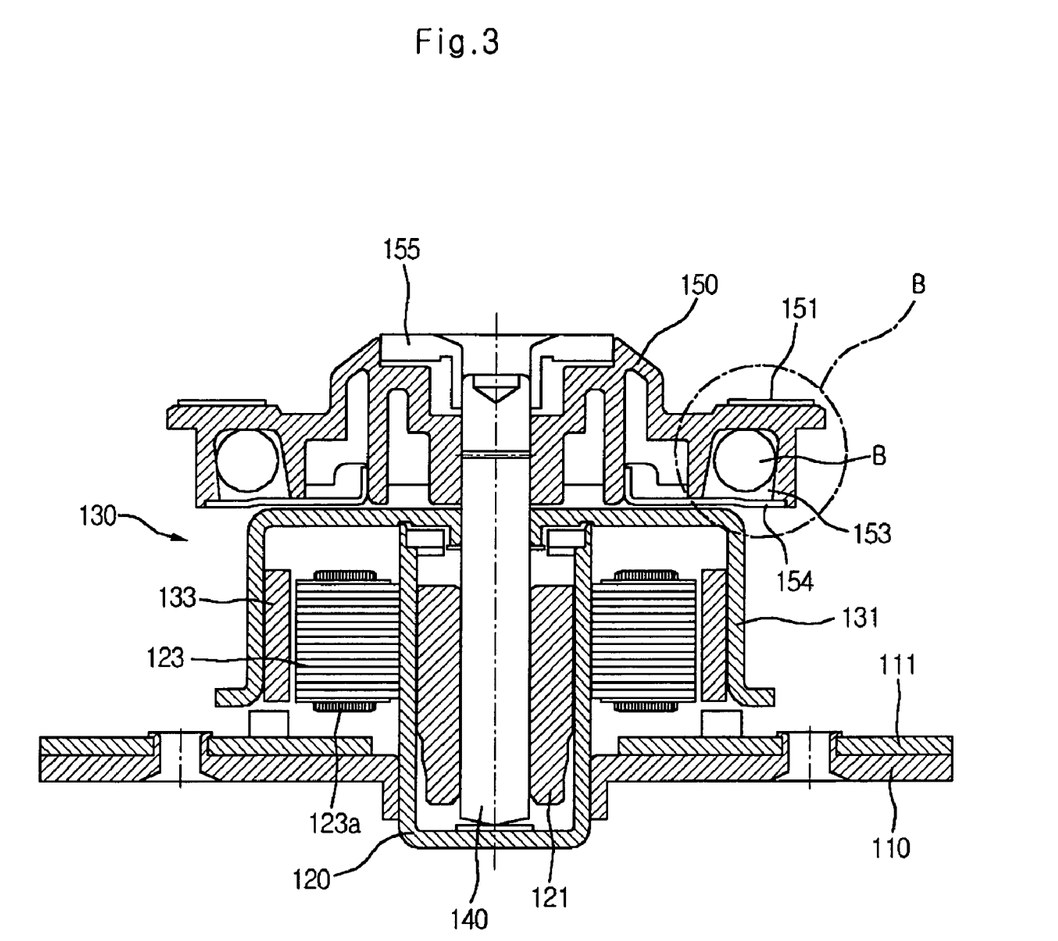
FIG. 3 is a sectional view illustrating a spindle motor structure in use for an optical disk drive according to a preferred embodiment of the invention.
Figure 4A:
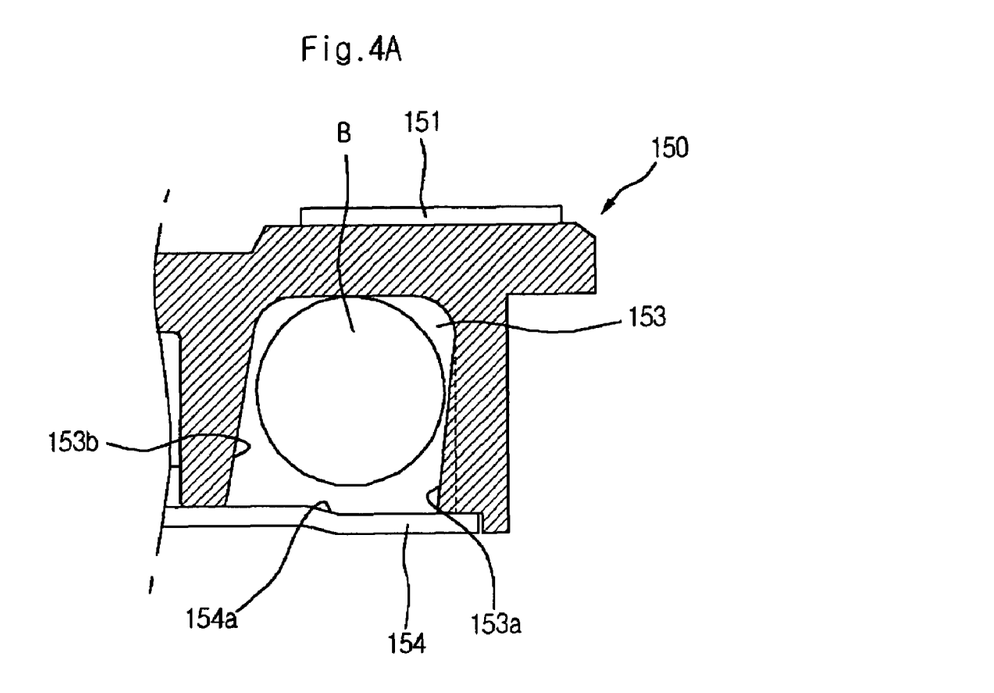
FIG. 4A is an enlargement of apart B in FIG. 3 in the rotation of the spindle motor.

FIG. 3 is a sectional view illustrating a spindle motor structure in use for an optical disk drive according to a preferred embodiment of the invention; FIG. 4A is an enlargement of a part B in FIG. 3 in the rotation of the spindle motor; and FIG. 4B is an enlargement of the part B in FIG. 3 at a parking position of the spindle motor.

Figure 4B:
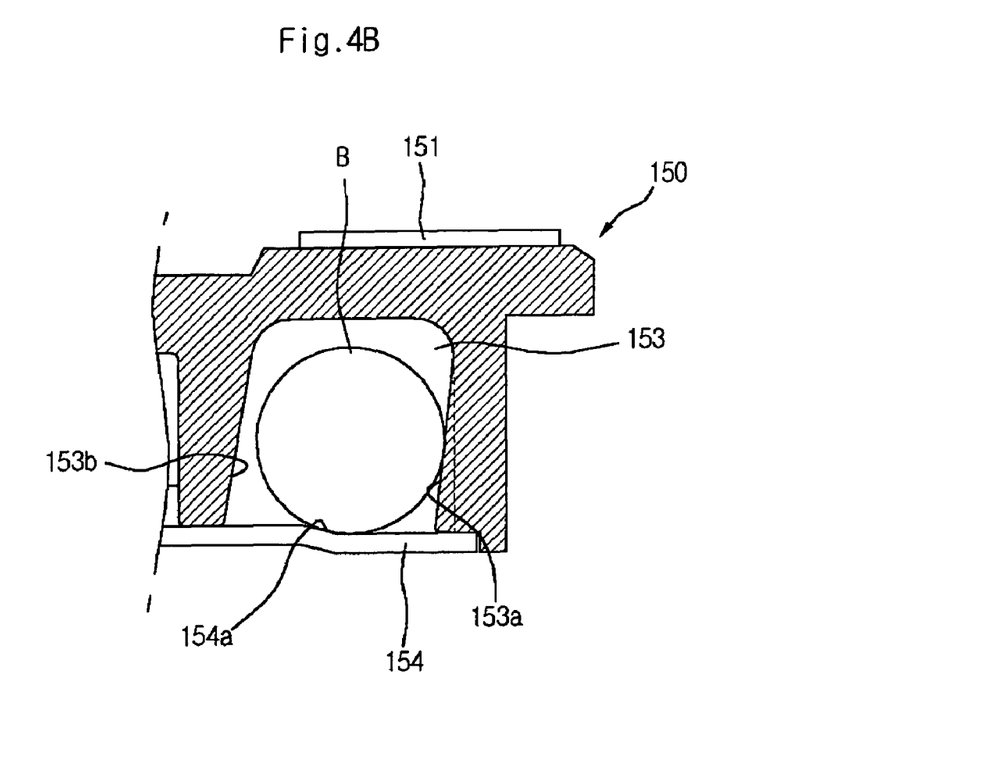
FIG. 4B is an enlargement of the part B in FIG. 3 at a parking position of the spindle motor.

Referring to FIGS. 3 to 4B, in the spindle motor in use for an optical disk driver of the invention, a stator includes a base plate 110 for fixing the spindle motor, a bearing housing 120 arranged in the center of the base plate 110 and having a metal bearing 121 installed therein and a core assembly 123 mounted on the outside wall of the bearing housing 120 and having a plurality of cores and winding coils 123a.

On the top of the base plate 110, there is installed a Printed Circuit Board (PCB) 111 for applying control voltage to the winding coils 123a.

A shaft 140 is rotatably coupled with the metal bearing 121 mounted within the bearing housing 120.

A rotor yoke 131 is fixed to the shaft 140 extended outside the bearing housing 120 to rotate along with the shaft 140.

The rotor yoke 131 is cylindrical shaped to surround the tops and sides of the bearing housing 120 and the core assembly 123, and has a magnet 133 attached on the inside surface opposed to the core assembly 123 to constitute a rotor 130.

The magnet 133 has a plurality of N and S poles repeatedly alternating with each other to generate magnetic flux, which in turn interacts with the magnetic flux from the core assembly 123 thereby to rotate the rotor 130.

A turntable 150 is fixed around the shaft 140 extended above the rotor yoke 131 to rotate along with the rotor 130.

The turntable 150 has a buffer member 151 attached on the top thereof to buffer the impact during the mounting of the optical disk and prevent the slippage of the optical disk during the rotation, and a ball container 153 formed on the bottom periphery thereof to receive a suitable number of balls B. Also, a ball cover 154 is coupled with the bottom of the ball container 153 to prevent the balls B from escaping from the ball container 153.

The ball container 153 is shaped as a circular track having an outer wall 153a, an inner wall 153b and a recess between the walls 153a and 153b to receive a suitable number of balls B. The outer wall 153a is inclined at a predetermined angle so that rotation of the turntable 153 raises a ball B upward along, for example, the outer wall 153a under the centrifugal force as shown in FIG. 4A.

The ball cover 154 has an inclination 154a at the bottom as shown in FIGS. 4A and 4B. When the spindle motor stops its rotation and the ball B moves down from the raised position, the inclination 154a increases the contact area of the ball cover 154 with the ball B to increase friction resistance.

Figure 5:
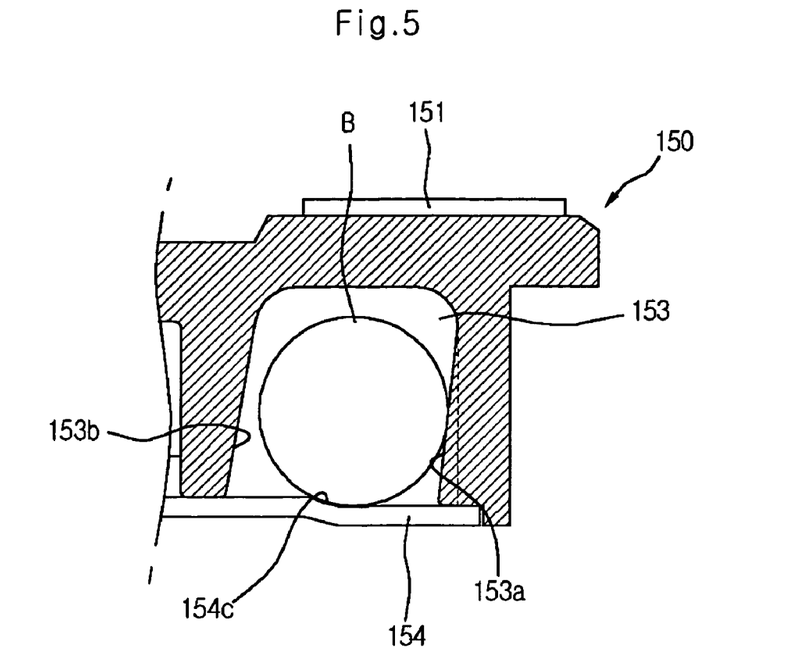
FIG. 5 is an enlarged sectional view of an alternate embodiment of the invention.

Referring to FIG. 5, the inclination 154a may be replaced with a rounded portion 154c to further increase the friction area between the ball B and the ball cover 154. More preferably, the rounded portion 154c is formed to have the same curvature as the ball B.

Also, the inclination or rounded portion preferably has a height of about 0.05 to 0.1 mm.

The turntable 150 has a clamp 155 fastened to the top of the shaft 140 to prevent the turntable 150 from escaping from the shaft 140.

The operation of the disk drive motor of the invention having the above construction will be described as follows.

First, current applied to the spindle motor is fed or flown to the winding coils 123a of the core assembly 123 via the PCB 111.

The current flowing through winding coils 123a generates magnetic field creating magnetic flux to the core assembly 123.

The magnetic flux from the core assembly 123 interacts with the magnetic flux from the magnet 133 provided in the inside surface of the rotor yoke 131 to turn the rotor 130.

That is, the rotor 130 is rotated under the magnetic force formed through the interaction or link between the magnetic fluxes of the winding coils 123a and the magnet 133.

The rotation of the rotor 130 also turns the shaft 140 coupled with the rotor 130, and thus the turntable 150 fixed to the shaft 140.

This in turn rotates the optical disk recorded with various data, seated on the buffer member 151 of the turntable 150.

In this case, since any unbalance of the optical disk may create vibration, a Ball Auto Balance System (Ball ABS) operates to prevent the vibration.

The balls B in the number of about 10 are received in the ball container 153 in the bottom periphery of the turntable 150 to move along the outer wall 153a of the ball container 153 in response to the rotation of the turntable 150.

The outer wall 153a has a predetermined inclination so that the balls B are easily raised upward under the centrifugal force while continuing rotation.

After that, when a user inputs a tray open signal to replace the optical disk, the turntable 153 loaded with the optical disk stops its rotation.

Then, the balls B in the turntable 150 still rotate under the inertia while gradually sliding down from the raised position along the outer wall 153a to the ball cover 154 under the self-weight.

As above, the balls B contact not only the outer wall 153a of the ball container 153 but also the bottom and inclination 154a of the ball cover 154 thereby to increase friction force so that the increased friction force can more rapidly stop the idling rotation of the balls B.

Figure 6:
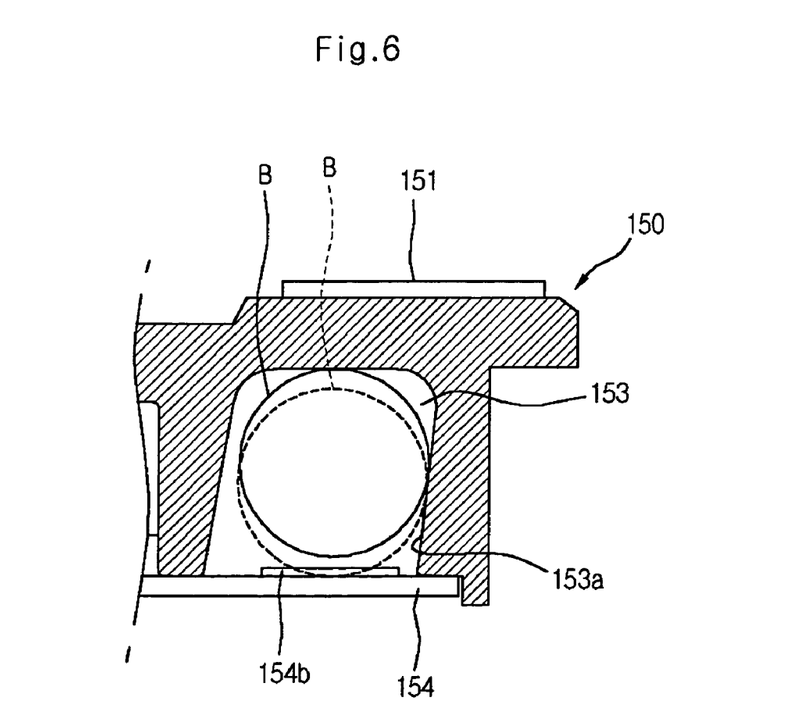
FIG. 6 is an enlarged sectional view of another alternate embodiment of the invention.
Figure 7:
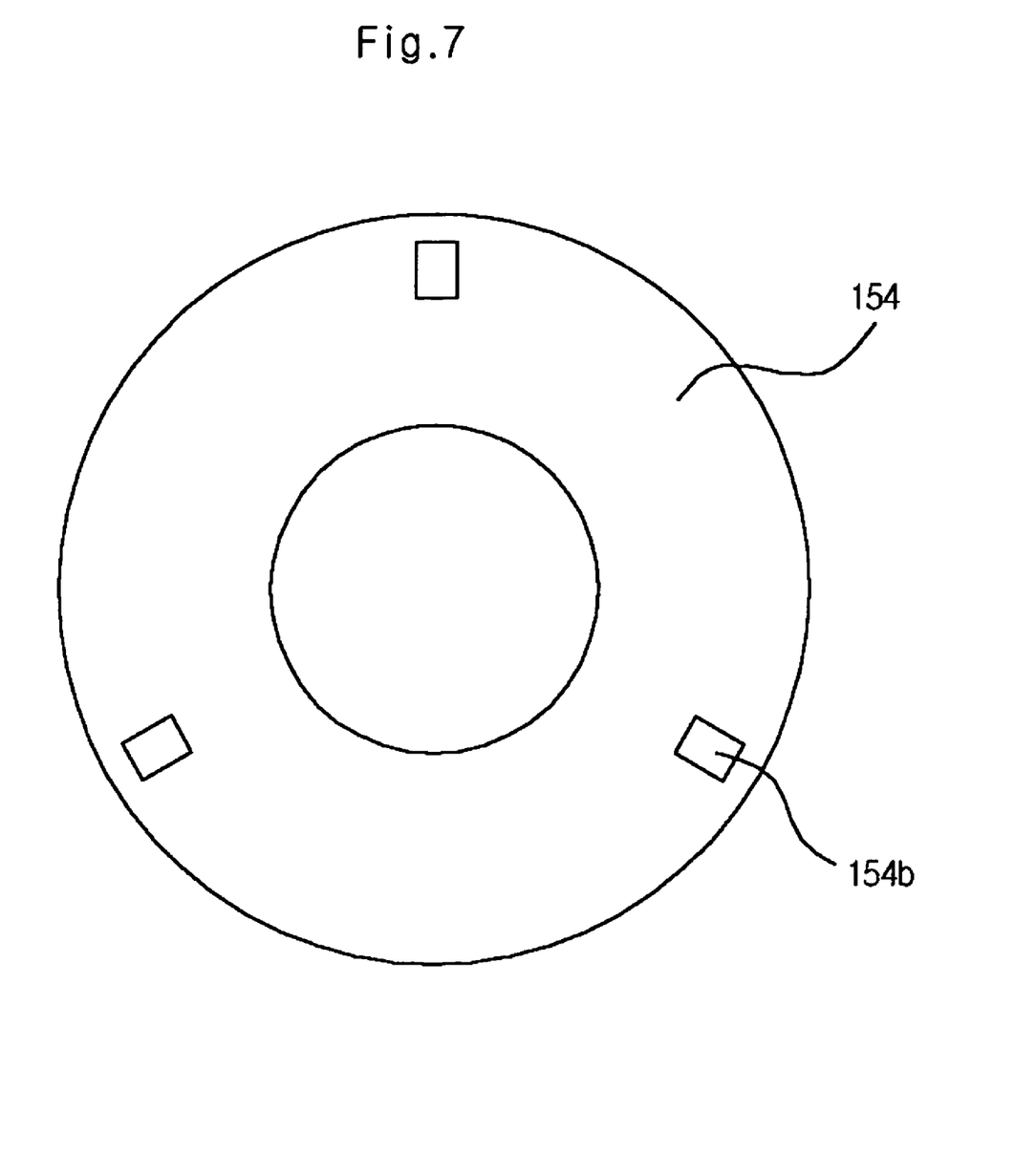
FIG. 7 is a plan view illustrating decelerating protrusions according to the another alternate embodiment of the invention.

FIG. 6 is an enlarged sectional view of another alternate embodiment of the invention, and FIG. 7 is a plan view illustrating decelerating protrusions according to the another alternate embodiment of the invention, in which a ball cover 154 has a suitable number of deceleration protrusions 154b on the top thereof to stop the idling rotation of the balls B as fast as possible after a tray is opened.

The operation of stopping balls with the deceleration protrusions 154b will now be described as follows.

When a user inputs a tray open signal for the purpose of optical disk replacement, even after a turntable 150 has stopped its rotation, the balls B still rotate under the inertia while sliding down from the raised position along an outer wall 153a to the bottom of a ball cover 154 under the self-weight.

Then, under the friction force induced from the contact with the outer wall 153a of the ball container 153 as well as the successive collision against the deceleration protrusions 154b on the ball cover 154 as shown in FIG. 7, the balls B lose speed to stop their rotation rapidly.

The ball cover 154 preferably has the deceleration protrusions 154b in the number of about more than 3 on the top thereof. Further, the deceleration protrusions have a height of about 0.05 to 0.1 mm.

Figure 8:
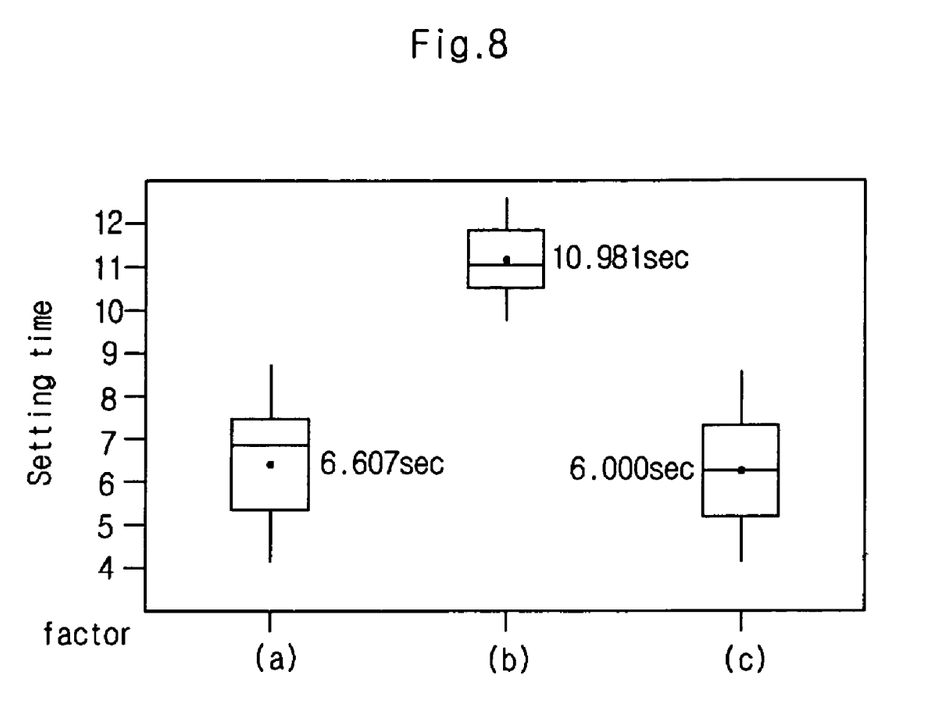
FIG. 8 is a graph illustrating deceleration results obtained from the embodiments of the invention.

FIG. 8 is a graph illustrating deceleration results obtained from the embodiments of the invention.

An experiment was performed to measure the time taken until balls completely stop after trays are opened with respect to three examples (a) to (c). The first example (a) had a ball cover 154 provided with an inclination 154a in according to an embodiment of the invention, the second example (b) was of the related art, and the third example (c) had a ball cover 154 provided with deceleration protrusions 154b on the top thereof according to another alternate embodiment of the invention, and results of the experiment are reported in FIG. 8.

As can be seen from the graph above, the conventional example (b) took 10.981 sec until balls B completely stopped idling, whereas the inventive example (a) with the inclination 154a formed in the ball cover 154 took 6.607 sec showing performance improvement of about 166%, and the inventive example (c) with the suitable number of deceleration protrusions 154 formed in the ball cover 154 took 6.000 sec showing performance improvement of about 183%.

The invention provides the ball cover with the inclination or deceleration protrusions that are designed to decelerate the balls so that when the tray is opened the balls can be stopped rapidly from idling to reduce ball noises.

Further, because the outer wall of the ball container is inclined, the balls can be raised upward along the inclined outer wall to avoid friction with the inclination or deceleration protrusions of the ball cover when they rotate with respect to the ball container. When the spindle motor is stopped, the inclined outer wall also serves to rapidly decelerate the rotation of the balls.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A spindle motor comprising:
   a stator;
   a shaft provided on the stator;
   a rotor coupled with the shaft;
   a turntable connected with the shaft, and having a ball container for receiving a plurality of balls therein, the ball container having an opening; and
   a ball cover configured to close the opening,
   wherein a decelerating portion is provided at the ball cover, for increasing a frictional force applied to the balls, when the turntable decelerates, and
   wherein the decelerating portion comprises an inclination of the ball cover, the inclination having a downwardly inclined portion declining away from the shaft in a radial direction of the shaft and having a downwardly inclined length that is shorter than a diameter of a corresponding ball such that the deceleration portion engages a circumference of the balls to decelerate the balls.

2. The spindle motor according to claim 1, wherein the inclination is rounded.

3. The spindle motor according to claim 2, wherein the inclination is rounded circumferentially at a curvature the same as that of the balls.

4. The spindle motor according to claim 1, wherein the inclination of the ball cover has a height of about 0.05 to 0.1mm.

5. The spindle motor according to claim 1, wherein the inclined surface is a single inclined surface in the ball container.

6. The spindle motor according to claim 1, wherein the ball container further comprises an inclined side wall for raising the balls to an upward position along the side wall when the turntable rotates, and the downwardly inclined portion engages the outer circumference of the balls when the turntable stops its rotation and the balls move down from the upward position to a bottom of the ball container such that the balls contact the inclined side wall and the inclined portion and decelerate.

7. The spindle motor according to claim 6, wherein the downwardly inclined portion engages the outer circumference of the balls at a position that is behind a vertical center axis of the corresponding ball such that the corresponding ball is inclined toward the inclined side wall.

8. The spindle motor according to claim 1, wherein the ball cover is formed over the rotor and the ball cover is separated from the rotor.

9. A spindle motor comprising:
a stator having a base plate, a bearing housing provided on the base plate, a core assembly provided on the bearing housing;
a shaft coupled with a metal bearing mounted on the bearing housing;
a rotor coupled with the shaft, and having a cylindrical rotor yoke and a magnet provided on the rotor yoke in a position opposed to the core assembly;
a turntable connected with the shaft, and having a ball container for receiving a plurality of balls therein, the ball container having an opening; and
a ball cover configured to close the opening,
wherein the ball container has an inner wall, an upper wall corresponding to the opening and an outer wall, and the outer wall is inclined to guide an up and down movement of the balls,
wherein the ball cover has an decelerating portion formed at a contact position of the balls, when the ball moves downward along the outer wall, and
wherein the decelerating portion comprises protrusions, provided on the ball cover and separated from the inner wall and the outer wall of the ball container, and portions of the ball cover between the inner wall and one edge of the protrusions and between the outer wall and another edge of the protrusions are planar.

10. The spindle motor according to claim 9, wherein the protrusions are provided in the number of more than 3.

11. The spindle motor according to claim 9, wherein the protrusions have a height of about 0.05 to 0.1mm.

12. The spindle motor according to claim 11, further comprising a buffer member for buffering impact at the mounting of an optical disk and preventing slippage.

13. The spindle motor according to claim 9, wherein the ball cover is formed over the rotor and the ball cover is separated from the rotor.

14. A spindle motor comprising:
a stator;
a shaft provided on the stator;
a rotor coupled with the shaft;
a turntable connected with the shaft, and having a ball container for receiving a plurality of ball therein, the ball container having an opening; and
a ball cover configured to close the opening and including a first plane surface, a second plane surface and an inclined surface in a circumferential direction,
wherein the inclined surface is formed between the first plane surface and the second plane surface, and
wherein the inclined surface includes a downwardly inclined portion declining away from the shaft in a radial direction of the shaft and having an downwardly inclined length that is shorter than a diameter of a corresponding ball such that the deceleration portion engages a circumference of the balls to decelerate the balls.

15. The spindle motor according to claim 14, wherein the inclined surface is a single inclined surface in the ball container.

16. The spindle motor according to claim 14, wherein the ball container further comprises an inclined side wall for raising the balls to an upward position along the side wall when the turntable rotates, and the downwardly inclined portion engages the outer circumference of the balls when the turntable stops its rotation and the balls move down from the upward position to a bottom of the ball container such that the balls contact the inclined side wall and the inclined portion and decelerate.

17. The spindle motor according to claim 16, wherein the downwardly inclined portion engages the outer circumference of the balls at a position that is behind a vertical center axis of the corresponding ball such that the corresponding ball is inclined toward the inclined side wall.

18. The spindle motor according to claim 14, wherein the ball cover is formed over the rotor and the ball cover is separated from the rotor.

* * * * *